United States Patent Office 3,457,227
Patented July 22, 1969

3,457,227
PREPARATION OF POLYOXYMETHYLENE USING METAL ACETYLACETONATE POLYMERIZATION CATALYSTS
Carl D. Kennedy, Ponca City, Okla., assignor to Continental Oil Company, Ponca City, Okla., a corporation of Delaware
No Drawing. Filed Mar. 11, 1965, Ser. No. 439,090
Int. Cl. C08g 1/02, 1/20
U.S. Cl. 260—67    7 Claims

ABSTRACT OF THE DISCLOSURE

Trioxane is polymerized or copolymerized with a oxymethylene-containing cyclic ether in the presence of molybdenum dioxydiacetylacetonate as the catalyst to provide a polyoxymethylene exhibiting improved properties.

---

This invention relates to the preparation of high molecular weight polyoxymethylene. More particularly, the invention relates to the polymerization and copolymerization of trioxane to high molecular weight polyoxymethylene, using as the catalyst molybdenum dioxydiacetylacetonate. In one of its specific, though nonlimiting aspects, the invention relates to the preparation of a new composition of matter which is a polyoxymethylene of improved stability, such improvement in stability resulting from the incorporation in the oxymethylene chain of a carbonyl function group.

It is known that high molecular weight polyoxymethylene can be obtained by contacting trioxane with certain acidic, cationic catalysts including antimony trifluoride, antimony fluoroborate, bismuth trifluoride, bismuth oxyfluoride, nickel fluoride, aluminum fluoride, titanium tetrafluoride manganous fluoride, manganic fluoride, mercuric fluoride, silver fluoride, zinc fluoride, ammonium bifluoride, phosphorous pentafluoride, hydrogen fluoride, fluorosulfonic acid, boron trifluoride, and silicon tetrafluoride. The high molecular weight polyoxymethylene can also be obtained by polymerizing formaldehyde with such catalysts as nickel carbonyl, aluminum isopropoxide, activated metallic aluminum, organophosphines, and aluminum chloride.

The present invention comprises a new method for preparing useful, high molecular weight polyoxymethylene, such method being based upon the discovery that molybdenum dioxydiacetylacetonate is a specifically effective catalyst for the polymerization of trioxane. When said acetylacetonate is used to catalyze the polymerization of trioxane, most of the resulting polyoxymethylene chains contain a carbonyl group thereby contributing to improved stability of the overall polymeric composition. The carbonyl groups are believed to be loacted at the termini of the oxymethylene chains, instead of the hydroxyl groups which have heretofore constituted the terminal groups characteristic of polyoxymethylene produced from trioxane using other catalyst systems.

Prior work in the field of trioxane polymerization has indicated that certain cyclic ethers can be copolymerized with trioxane to produce a copolymer having better heat stability than the polyoxymethylene produced by the polymerization of substantially pure trioxane monomer. I have determined that similar beneficial copolymerization can also be accomplished by the process of the present invention, thus further improving the stability of polymers produced with certain of the metal oxide acetylacetonate catalysts of the invention.

From the foregoing summary description of the invention, it will have become apparent that it is an important object of the invention to produce a novel process for preparing high molecular weight polyoxymethylene.

Another object of the invention is to provide a process for preparing high molecular weight polyoxymethylene of improved thermal stability.

An additional object of the invention is to provide a novel polymeric composition comprising polyoxymethylene units containing at least one carbonyl functional group.

Other objects, as well as certain advantages and salient features, of the invention, will become apparent from the more detailed description of the invention, and the examples of its practice, which hereinafter appear.

As hereinbefore indicated, the process of the present invention comprises contacting certain low molecular weight oxymethylene compounds with the molybdenum complex of the enol form of acetylacetone. The oxymethylene compounds subject to polymerization, trioxane (a cyclic trimer of formaldehyde), and mixtures of trioxane with oxymethylene-containing cyclic ethers having the structural formula

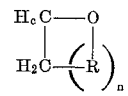

wherein R is a divalent oxymethylene group, $\text{+O—CH}_2\text{+}$, and wherein $n$ is an integer of at least 1, and preferably does not exceed 3. Glycol formal constitutes the most preferred cyclic ether for use in the copolymerization. In the copolymerization of the trioxane and cyclic ether, the mole ratio of cyclic ether to trioxane used is less than 0.5 and is preferably less than 0.2.

The described oxymethylene compounds which are subjected to polymerization in the process of the present invention can, of course, be the pure compounds described, or can conveniently be derived from several other more readily available sources.

Commercially available trioxane of better than 99 percent purity is available and can be used in the trioxane polymerization, although best results are obtained with trioxane purified by recrystallization from petroleum ether or methylene chloride.

It is desirable that all oxymethylene starting materials, the catalysts and polymerization solvents be substantially anhydrous, although minute amounts of moisture can be tolerated.

In the polymerization or copolymerization of trioxane in accordance with this invention, the polymerization is beneficially carried out in a solvent in which the catalyst is soluble, but which is not reactive with either the catalyst or the monomer materials. A number of hydrocarbons, halogenated hydrocarbons and other organic compounds meet the foregoing requirements. Illustrative of suitable solvents are: n-heptane, n-hexane, benzene, toluene, cyclohexane, decahydronaphthalene, methylene chloride, chloroform, carbon tetrachloride, pentane, xylene, nonane and decane, and nitrobenzene. Heptane, cyclohexane and methylene chloride are the preferred solvents.

In addition to solution polymerization of the trioxane, the polymerization of this monomer can be carried out with the monomer in a molten state and without utilizing any solvent. Also, a suspension polymerization of the trioxane can be effected in which the trioxane is insoluble in an inert, non-aqueous liquid reaction medium and is retained in suspension therein, or at least is phased out of solution by cooling during the polymerization procedure. Relatively high viscosity mineral oils and similar non-solvents for the trioxane can be used in the suspension polymerization procedure, and a suitable surface active agent, can be used to disperse the particles more finely.

When polymerizing trioxane in the presence of solvent, maximum yields of polyoxymethylene are realized at a ratio of 2 ml. solvent to 1 gram of trioxane or less. For most applicable solvents, the preferred ratio of solvent to trioxane ranges from about 0.125 to about 0.5 ml./gram.

In the case of the trioxane polymerization, from $1 \times 10^{-4}$ mole percent to about 10 mole percent of the catalyst should be employed (based on the mole equivalents of trioxane subjected to polymerization). Preferably from about $1 \times 10^{-3}$ to about 1.0 mole percent of the catalyst is utilized.

Trioxane has a melting point of 64° C. and a boiling point of about 110° C., but the suspension type polymerization of this material can be carried out at temperature as low as 55° C. Melt polymerization of the trioxane can also be carried out with the trioxane super-cooled below its normal melting point prior to addition of the catalyst. Also, operating under superatmospheric pressures, temperatures as high as 120° C. can be employed during the polymerization, provided the pressure is sufficient to retain the trioxane in the liquid state. In the preferred solution polymerization, the temperature range is preferably maintained from about 65° C. to about 100° C.

Pressure is not critical in the polymerization of the trioxane. Thus, while it is generally preferred to conduct the trioxane polymerization at a superatmospheric pressure either atmospheric, superatmospheric or subatmospheric pressures can be employed.

After completion of the polymerization reactions, the polyoxymethylene polymer is contacted with ammonium hydroxide to remove entrained catalyst therefrom. Preferably, this purification treatment of the polymer is carried out at ambient temperatures to avoid a tendency toward decomposition.

The following examples are given to illustrate the polymerization of trioxane using molybdenum dioxydiacetylacetonate as the polymerization catalyst in accordance with this invention.

In the majority of the examples, the polymerizations were carried out in beverage bottles which were thoroughly cleaned, oven dried and flushed with argon. Either molten trioxane injected into the bottle with a hot syringe or crystalline trioxane was then added to the bottle. In general, the trioxane, or the trioxane-solvent mixture was heated to melt or solution, respectively, prior to addition of the catalyst. After catalyst addition, the bottle was then immediately capped with a neoprene septum and heated in a constant temperature oil bath at 100° C. The reaction bottle and its contents were left in the oil bath for 15 minutes after the reaction period occurred.

Two methods for treatment of the polyoxymethylene polymer with ammonium hydroxide were used. In the first method the polymer was permitted to stand at room temperature with four to five times its weight of $NH_4OH$ in a beaker for from 1 to 12 hours. In the second method the polymer was placed in a sealed beverage bottle with four to five times its weight of $NH_4OH$ and heated from 30 minutes to several hours in a 100° oil bath. Whichever of the above methods were used, the product mixture was filtered, washed twice with twenty times its original weight of water, and finally with acetone or methanol to facilitate drying. The product was then oven dried at approximately 50–60° C.

The thermal stability tests ($K_{222}$) were run by measuring the percent weight loss per minute at 222°. The rates were measured at the flat portion of a plot of percent weight loss vs. time.

Where the procedures or materials employed departed from those described above, the nature of such departures are described in the examples.

EXAMPLES 1–10

These examples illustrate the effect of varying the relative amounts of solvent and trioxane on the yield and inherent viscosity of the polymer product. All of these polymerizations as set forth in Table I were run in sealed beverage bottles and the molar ratio of catalyst to trioxane used in each example was $4.5 \times 10^{-5}$ except in Example 6 where the molar ratio was $5 \times 10^{-5}$. The inherent viscosities were run on $NH_4OH$ treated products which were acetate capped.

TABLE I

| Example: | Ml. cyclohexane/g. trioxane | Percent yield of $NH_4OH$ treated product | Inherent viscosity |
|---|---|---|---|
| 1 | 0 | 50 | 0.58 |
| 2 | 0.125 | 77 | 1.26 |
| 3 | 0.125 | 78 | |
| 4 | 0.250 | 74 | 1.29 |
| 5 | 0.250 | 74 | |
| 6 | [1] 0.500 | 48 | 1.57 |
| 7 | 0.500 | 52 | |
| 8 | 0.75 | 56 | 1.83 |
| 9 | 1.00 | 17 | |
| 10 | 1.00 | 14 | |

[1] At a ratio of $5.0 \times 10^{-5}$ moles of catalyst to trioxane and this solvent-ratio 93% yield was obtained using trioxane recrystallized from $H_2CCl_2$. The trioxane used for the above experiments was recovered from the filtrate from trioxane recrystallized in $H_2CCl_2$.

EXAMPLES 11–19

The polymerization runs described in Table II illustrate the effect of varying the molar ratio of the molybdenum dioxydiacetylacetonate to trioxane on the yield and properties of the polymer product. Each of the polymerization runs was carried out in a sealed beverage bottle. Except in the one run indicated, 0.22 mole of trioxane was used in each polymerization and 2 grams of trioxane was used for each ml. of the cyclohexane solvent employed.

TABLE II

| | | | Inherent viscosity | | | |
|---|---|---|---|---|---|---|
| | Moles catalyst$\times 10^4$/mole trioxane | Percent yield [1] | Acetate capped | On pressed film | Original powder | Efficiency, g. polymer/g. catalyst | $K_{222}$ |
| Example: | | | | | | | |
| 11 | 0.194 | None | | | | | |
| 12 | 0.29 | 10 | | | 1.08 | | |
| 13 | 0.39 | 70 | | 2.82 | 1.48 | 5,400 | 1.04 |
| 14 | [2] 0.50 | [2] 93 | | 1.71 | [1] 1.05 | 5,130 | |
| 15 | 0.775 | 86 | 1.41 | 2.23 | 1.226 | 3,070 | 0.76 |
| 16 | 1.55 | 89 | 1.71 | 1.63 | 0.53 | 1,575 | 1.46 |
| 17 | 3.10 | 79 | 1.22 | | 0.26 | 686 | |
| 18 | 6.70 | 62 | 0.71 | Insoluble | | 270 | |
| 19 | 12.40 | 54 | 0.62 | | 0.39 | 118 | |

[1] After $NH_4OH$ treatment.
[2] Two moles trioxane was used in this experiment.

EXAMPLES 20–32

These examples demonstrate that trioxane can be polymerized in the molten state (in the absence of solvent) with molybdenum dioxydiacetylacetonate. Some of the polymerization runs were carried out at room temperature by super-cooling the molten trioxane. The polymerizations were run in dry, argon-flushed bottles. The ingredients were placed in each bottle which was sealed and heated in an oil bath. The results of these polymerization runs are set forth in Table III.

EXAMPLES 33–52

A number of polymerization runs were carried out for the purpose of evaluating various types of solvents for use in the polymerization procedure. The runs were made in sealed beverage bottles using 0.22 mole of trioxane except where indicated, and the reaction mixtures were heated in an oil bath at 100° C. The results of these polymerization are set forth in Table IV.

TABLE IV

| Example:[1] | Solvent | (Ml.) | Trioxane history | Mole catalyst $\times 10^{-4}$ | Min. to reaction | Percent yield | $\eta_{inh}$ |
|---|---|---|---|---|---|---|---|
| 33 | $H_2CCl_2$ | (20) | ([2]) | 1.4 | 45 | 65 | 0.49 |
| 34 | $H_2CCl_2$ | (20) | ([2]) | 1.4 | 13 | 47 | 0.49 |
| 35 | $CCl_4$ | (20) | ([2]) | 1.4 | 17 | 37 | 0.21 |
| 36 | $nC_7$ | (20) | ([2]) | 1.4 | 35 | 28 | 0.51 |
| 37 | $CH_3COCH_3$ | (20) | ([2]) | 1.4 | 15 | 2 | 0 |
| 38 | Benzene | (20) | ([2]) | 1.4 | [3]20 | 10 | 0.51 |
| 39 | Trichloroethylene | (10) | ([4]) | 0.70 | 18 | 24 | ---- |
| 40 | do | (10) | ([4]) | 0.70 | 35 | 52 | 0.63 |
| 41 | $nC_7$ | (20) | ([5]) | 0.70 | 27 | 62 | 0.92 |
| 42 | Cyclohexane | (20) | ([5]) | 0.70 | 29 | 38 | 0.67 |
| 43 | $H_2CCl_2$ | (20) | ([6]) | 0.70 | 5 | 59 | 0.09 |
| 44 | $H_2CCl_2$ | (20) | ([6]) | 0.70 | 5 | 62 | 0.08 |
| 45 | Cyclohexane | (20) | ([6]) | 0.70 | 8 | 27 | 0.53 |
| 46 | $H_2CCl_2$ | (20) | ([6]) | 0.70 | 8 | 57 | 0.12 |
| 47 | $H_2CCl_2$ | (20) | ([6]) | 0.35 | 8 | 24 | 0.10 |
| 48 | $H_2CCl_2$ | (20) | ([2]) | 0.70 | 8 | 60 | 0.13 |
| 49 | Cyclohexane | (10) | ([4]) | 0.70 | 5–7 | 98 | 0.65 |
| 50 | do | (20) | ([4]) | 0.70 | 5–7 | 61 | 0.78 |
| 51 | do | (10) | ([2]) | 0.70 | <5 | 78 | 0.21 |
| 52 | $H_2CCl_2$ | (20) | ([6]) | 0.70 | 12 | 50 | 0.37 |

[1] Examples 46 and 47 each involved 0.44 mole trioxane.
[2] Commercial nonrecrystallized trioxane.
[3] The reaction appeared to progress slowly; solid started precipitating at about 20 min.
[4] Trioxane was recrystallized from $H_2CCl_2$. The solvents were freshly distilled prior to use.
[5] A different batch of commercial trioxane that in ([2]) was used.
[6] Trioxane was treated by melting commercial trioxane, filtering off solid material and placing filtrate in reaction bottles.

EXAMPLE 53–65

A series of molybdenum dioxydiacetylacetonate catalyzed trioxane polymerizations were carried out at atmospheric pressure. The reactions were carried out in mechanically stirred resin flasks equipped with a condenser and a nitrogen flush line and during refluxing of the solvent. The conditions obtaining during the runs and the results obtained are set forth in Table V.

TABLE III

| Example: | Mole trioxane | Mole catalyst $\times 10^4$ | Bath temp., °C. | Temp. of trioxane when catalyst was added (°C.) | Temp. of melt when reaction started, °C. | Max. temp. reached, °C. | Min. to reaction | Percent yield | $\eta_{inh}$ |
|---|---|---|---|---|---|---|---|---|---|
| 20 | [1] 0.22 | 1.4 | 101 | [2] RT | | | 41 | 60 | 0.82 |
| 21 | [1] 0.22 | 1.4 | 135 | RT | | | 10 | 55 | 0.77 |
| 22 | [1] 0.22 | 9.6 | 115 | RT | | | 25 | 32 | 0.28 |
| 23 | [1] 0.33 | 1.4 | 100 | RT | | | 20 | 62 | ---- |
| 24 | [1] 0.22 | 0.35 | 100 | 65–75 | | | 5 | 47 | 0.38 |
| 25 | [1] 0.22 | 0.35 | 100 | 65–75 | | | 5 | 46 | 0.48 |
| 21 | [3] 0.67 | 0.70 | 100 | 65–75 | | | 5 | 35 | 1.04 |
| 21 | [3] 0.67 | 0.70 | 100 | 78 | 95 | | 10 | 21 | 0.36 |
| 28 | [3] 0.67 | 1.40 | ---- | 60 | 58 | | 0>1 | 60 | 0.10 |
| 29 | [3] 0.67 | 0.70 | ---- | 98 | 80 | 95 | 3 | 73 | 0.10 |
| 30 | [3] 0.67 | 0.70 | 100 | 60–65 | 95 | 106 | 10 | 62 | 0.32 |
| 31 | [4] 0.22 | 0.20 | 100 | 65–75 | 87 | 104 | ---- | 50 | 0.58 |
| 32 | [4] 0.22 | 0.20 | 100 | 65–75 | 87 | 104 | ---- | 29 | ---- |

[1] Commercial nonrecrystallized trioxane was used.
[2] RT is a symbol used for room temperature.
[3] Commercial trioxane was melted, filtered, and let stand over $CaH_2$ at 100° C. for 12 hrs. prior to use.
[4] Trioxane used was isolated from the filtrate of trioxane recrystallization from $H_2CCl_2$.

TABLE V

| Example | History of trioxane used | Moles trioxane | Solvent | Ml. solvent | Moles catalyst ×10⁴ | Reaction conditions | Percent yield | Comments |
|---|---|---|---|---|---|---|---|---|
| 53 | (¹) | 0.44 | HCCl₃ | 36 | 1.0 | (²) | 68 | Polymerization started within 5 min. after the molybdenum dioxydiacetylacetonate solu. was added. When reaction started, 60 ml. more HCCl₃ was immediately added, and reflux was continued 20 min. |
| 54 | (¹) | 0.67 | CCl₄ | Initially 150 | 3.0 | (³) | 15 | CCl₄ was collected in a Dean-Stark separator. When 26 ml. of CCl₄ (containing some trioxane) had distilled from the mixture, reaction occurred. |
| 55 | (¹) | 1.0 | CCl₄ | 150 | 3.0 | (³) | 13 | Reaction started at about 4 min. after reflux was reached. The mixture was then heated about 3 hr. at reflux. |
| 56 | (⁴) | 0.67 | CCl₄ | 75 | 3.0 | (³) | 23 | Polymer started forming at about 2 min. from addition of molybdenum dioxydiacetylactetonate. The mixture was refluxed for 1 hr. total. |
| 57 | (⁴) | 0.67 | Cyclohexane | 75 | 3.0 | (³) | 24 | Additional (15 ml.) cyclohexane was added at 2 min. from molybdenum dioxydiacetylacetonate which was when polymerization seemed to occur. After 8 min. reflux, the reaction was quenched. |
| 58 | (⁴) | 0.67 | nC₆H₁₄ | 75 | 3.0 | (³) | 37 | Polymer started forming within 1 min. from addition of molybdenum dioxydiacetylacetonate. Mixture was heated at reflux 6 min. after the polymerization started. |
| 59 | (⁴) | 0.67 | nC₆H₁₄ | 75 | 6.0 | (³) | 31 | Polymer formation started at about 10 min. after addition of molybdenum dioxydiacetylacetonate. |
| 60 | (⁴) | 1.0 | nC₅H₁₂ / H₂CCl₂ | 125 / 150 | 1.4 | (⁵) | | When heat was removed and stirring stopped the mixture polymerized within 1 min. |
| 61 | (¹) | 1.0 | nC₆H₁₄ | 125 | 1.4 | (⁶) | 70 | Molybdenum dioxydiacetylacetonate was added to the two phase systems. Which was then vigorously stirred. Reaction occurred within about 10 min. from addition of catalyst and seemed to be complete. No heat was applied after addition of molybdenum dioxydiacetylacetonate. Reaction was quenched at 10 min. by addition of acetone. |
| 62 | (⁴) | 1.0 | nC₆H₁₄ | 125 | 1.4 | (⁷) | 32 | Reaction occurred within 1 min. from addition of molybdenum dioxydiacetylacetonate in both Examples 80 and 81. No heat was applied after molybdenum dioxydiacytlacetonate was added. The reactions were quenched after 30 min. stirring. |
| 63 | (⁴) | 1.0 | nC₆H₁₄ | 125 | 2.8 | (⁷) | 33 | |
| 64 | (⁸) | 1.0 | nC₆H₁₄ | 125 | 1.4 | (⁹) | 20 | Reaction occurred when the misture reached 65°. Heating at 65° was maintained for 15 min. |
| 65 | (⁹) | 0.33 | nC₆H₁₄ / Cyclohexane | 40 / 3 | 1.0 | (¹⁰) | 40 | Reaction occurred within 3 min. of molybdenum dioxydiacetylacetonate addition. The stirred reaction mixture was kept at 64° C. for 15 min. after reaction occurred. |

¹ Commercial untreated monomer trioxane.
² The mixture was heated to reflux with N₂ passed through the system, then the catalyst was added as a solution in 1 ml. of hot HCCl₃.
³ Solid molybdenum dioxydiacetylacetonate was added when the mixture reached reflux.
⁴ Commercial trioxane was dissolved in warm solvent and filtered into the reaction flask through a buchner funnel.
⁵ Solvent was gradually removed by distillation. After 20 min. from start of distillation, most of the solvent was removed. Heat was removed.
⁶ Solution was attained, then the mixture was allowed to cool to 58° C., 3 to 4 degrees below temp. required to form two phases.
⁷ Solution was attained, then the mixture was allowed to cool to 56–58° C., then the molybdenum dioxydiacetylacetonate was added.
⁸ Trioxane was recrystallized from H₂CCl₂.
⁹ Solution was attained and the molybdenum dioxydiacetylacetonate was added at about 62°.
¹⁰ Trioxane recrystallized from H₂CCl₂ was dissolved in the solvent mixture and heated to 64° C., then the molybdenum dioxydiacetylacetonate was added.

EXAMPLES 66–76

As has been previously indicated herein, the polyoxymethylene produced by trioxane polymerization using the catayst of the present invention appears to be structurally different from polyoxymethylenes heretofore obtained using catalyst which operates by cationic initiation. The mechanism by which the polymerization proceeds in the present invention is thought to be of an insertion type in which a fragment of the catalyst employed apparently is attached to one end of the growing polymer chain, yielding a chain with an end group other than the hydroxyl group which has heretofore been characteristic of polyoxymethylene polymers produced using other known catalysts.

The exact nature of the terminal group which characterizes the polyoxymethylene made by trioxane polymerization in accordance with this invention is not known, but infrared analysis indicates carbonyl group absorption attributable to a part of the polymer produced, and not to residual catalyst. The infrared absorption band is at 1702 cm.⁻¹ (in the carbonyl region) and is not seen in IR analyses of polymer produced from formaldehyde or from trioxane using BF₃ catalyst. In addition to this evidence of partial capping of the polyoxymethylene produced from trioxane by polymerization with a molybdenum dioxydiacetaylacetonate catalyst, a comparison of the inherent viscosity and thermal degradation properties of this polyoxymethylene with the polyoxymethylenes derived from formaldehyde polymerizations in accordance with the process of the present invention shows that a substantial difference is stability and viscosity exists between the two polymer types. Infrared analysis indicates that the formaldehyde derived polymer is characterized by the conventional hydroxyl end groups. The data set forth in Table VI shows that the polyoxymethylene derived from molybdenum dioxydiacetylacetonate catalyzed trioxane polymerizations is more stable than the polyoxymethylene derived from the formaledhyde polymerizations. The trioxane-derived polyoxymethylenes referred to in Table II had lower inherent viscosities than any of the formaldehyde-derived polymers with which they were compared.

TABLE VI

| Source of Polymer | | $\eta_{inh.}$ of powder | $\eta_{inh.}$ of film | $K_{222}$ |
|---|---|---|---|---|
| Example: | | | | |
| 66 | MODAc-Trioxane [1] | | 2.82 | 1.04 |
| 67 | MODAc-Trioxane | | 1.67 | 1.47 |
| 68 | do | 1.24 | 1.47 | 2.82 |
| 69 | do | 0.80 | 0.76 | 4.20 |
| 70 | do | 0.50 | 0.69 | 5.0 |
| 71 | do | 0.40 | 0.68 | 4.84 |
| 72 | MODAc-H$_2$CO | 1.26 | | 7.5 |
| 73 | MODAc-H$_2$CO | 1.58 | | 7.7 |
| 74 | MODAc-H$_2$CO | 1.71 | | 6.6 |
| 75 | MODAc-H$_2$CO | 1.84 | | 4.3 |
| 76 | MODAc-H$_2$CO | 0.98 | | 3.6 |

[1] MODAc is the symbol used for molybdenum dioxydiacetylacetonate.

EXAMPLES 77–82

As has previously been indicated herein, it has been determined that the molybdenum dioxydiacetylacetonate catalyst found effective to polymerize trioxane to polyoxymethylene is also effective to induce copolymerization of trioxane and oxymethylene containing cyclic ethers of the type hereinbefore described to produce polyoxymethylene copolymers having improved thermal stability. Substantially the same conditions of polymerization are employed as are used in the case of the trioxane monomer polymerizations. In the copolymerizations, a molar ratio of from about 0.01 to 0.2 glycol formal to trioxane can be used, but a substantial improvement in the thermal stability of the copolymer product can generally be obtained using a molar ratio of from about 0.05 to about 0.15. Examples 77–82 in Table VII demonstrate the improvement in the polymer product which is obtained when the trioxane is copolymerized with a small amount of glycol formal using the molybdenum dioxydiacetylacetonate catalyst of the invention. Example 77 is a monopolymerization of the trioxane. The other examples illustrate the use of various molar ratios of glycol formal to trioxane.

I claim:

1. The method of preparing high molecular weight polyoxymethylene comprising contacting, at a temperature of from about 55° C. to 120° C., trioxane as the sole polymerizable material with molybdenum dioxydiacetylacetonate catalyst at a catalyst to trioxane ratio of at least $1 \times 10^{-6}$ mole of catalyst per mole of trioxane.

2. The method defined in claim 1 wherein said trioxane is dissolved in an amount of an inert organic solvent which does not exceed two milliliters of solvent per gram of trioxane.

3. The method defined in claim 1 wherein the mole ratio of catalyst to trioxane utilized is from about $1 \times 10^{-5}$ to about 0.01.

4. The method defined in claim 1 wherein the trioxane and catalyst are contacted at a temperature of from about 65° C. to about 100° C.

5. The method defined in claim 1 wherein said trioxane is in the liquid state during said contact.

6. The method defined in claim 2 wherein said inert organic solvent is selected from the group consisting of heptane, hexane and methylene chloride, and the amount of said solvent employed does not exceed 1.25 milliliters of solvent per gram of trioxane.

7. The method defined in claim 1 and further characterized to include the step of washing the polymer resulting from said contact with ammonium hydroxide to remove residual catalyst therefrom.

TABLE VII

| | Molar ratio of catalyst to trioxane ×10$^4$ | Molar ratio of glycol formal to trioxane | Percent yield [2] | M.P.[3] | $\eta_{inh.}$ | $K_{222}$ | Percent total decomposition at 222° in— | | Properties |
|---|---|---|---|---|---|---|---|---|---|
| | | | | | | | 15 min. | 60 min. | |
| Example: [1] | | | | | | | | | |
| 77 | 6.35 | 0 | 87 | 185 | 0.41 | 4.87 | [4] 48 | [4] 85 | Poor. |
| 78 | 6.35 | 0.059 | 83 | 172 | 0.83 | [5] 0 | 6 | 7 | Good. |
| 79 | 6.35 | 0.119 | 82 | 172 | 0.74 | [5] 0 | 4 | 4 | Do. |
| 80 | 4.5 | 0.059 | 87 | 180 | | | | | Fair. |
| 81 | 4.5 | 0.119 | 82 | 177 | | | | | Do. |
| 82 | 4.5 | 0.178 | 77 | 165 | | | | | Fair-poor. |

[1] Examples 77–79 were run using trioxane from a different recrystallization than that used for runs 80–82.
[2] After NH$_4$OH treatment and based on combined weights of glycol and trioxane.
[3] Recorded M.P. is temperature at which polymer powder first started to melt.
[4] The percent decomposition of this sample was not determined; however, decomposition data for another polymer sample prepared by the same procedure, but from unrecrystallized trioxane, having the same inherent viscosity is substituted here.
[5] Determined for the straight line portion after the first 15 minutes.

References Cited

UNITED STATES PATENTS

| 2,989,509 | 6/1961 | Hufgin et al. | 260—67 |
| 3,194,788 | 7/1965 | Kullmar et al. | 260—67 |
| 3,208,975 | 9/1965 | Vanderberg | 260—67 |
| 3,219,623 | 11/1965 | Berardinelli | 260—67 |
| 3,267,076 | 8/1966 | Ishii et al. | 260—67 |
| 3,305,529 | 2/1967 | Reynolds | 260—67 |
| 3,306,878 | 2/1967 | Barton | 260—67 |
| 3,027,352 | 3/1962 | Walling et al. | 260—67 |

OTHER REFERENCES

Novak et al.: Faraday Society Transaction, vol. 55, No. 441 (September 1959), pp. 1484–89.

Modena et al.: Journal of Polymer Science, part B, vol. 1, No. 10 (October 1963), pp. 567–570.

WILLIAM H. SHORT, Primary Examiner

L. M. PHYNES, Assistant Examiner